(12) United States Patent
McAdam et al.

(10) Patent No.: US 11,880,184 B2
(45) Date of Patent: Jan. 23, 2024

(54) OPERATOR CONSOLE PROVIDING GUIDANCE FOR OPERATOR DECISIONS

(71) Applicant: Honeywell International Inc., Morris Plains, NJ (US)

(72) Inventors: Rohan James McAdam, Walang (AU); Graeme John Laycock, Hunters Hill (AU); Peter Carl Davis, Gordon (AU)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 17/323,518

(22) Filed: May 18, 2021

(65) Prior Publication Data
US 2021/0373527 A1 Dec. 2, 2021

Related U.S. Application Data

(60) Provisional application No. 63/031,903, filed on May 29, 2020.

(51) Int. Cl.
*G05B 19/40* (2006.01)
*G05B 19/4063* (2006.01)
*G05B 19/418* (2006.01)

(52) U.S. Cl.
CPC ....... *G05B 19/4063* (2013.01); *G05B 19/418* (2013.01); *G05B 2219/23067* (2013.01);
(Continued)

(58) Field of Classification Search
CPC .............. G05B 19/4063; G05B 19/418; G05B 2219/23067; G05B 2219/23174;
(Continued)

(56) References Cited

U.S. PATENT DOCUMENTS

| 5,553,304 A | 9/1996 | Lipner et al. |
| 7,593,837 B2 | 9/2009 | Nakaya et al. |

(Continued)

FOREIGN PATENT DOCUMENTS

| CN | 110073301 A | 7/2019 |
| EP | 3270243 A1 | 1/2018 |

(Continued)

OTHER PUBLICATIONS

Canadian Office Action dated Jul. 14, 2022, issued in connection with corresponding Canadian Patent Application No. 3119369 (4 pages total).

(Continued)

*Primary Examiner* — Robert E Fennema
*Assistant Examiner* — Christopher W Carter
(74) *Attorney, Agent, or Firm* — John Maldjian, Esq.; Stevens & Lee PC (57) ABSTRACT

A method includes determining a current situation to be present in a process controlled by an industrial process control and automation system (IPCS) that includes at least one process controller coupled to input output (I/O) modules coupled to field devices including sensors and actuators that are coupled to processing equipment. Responsive to the current situation, displaying a plurality of suggested actions each including at least one step in a selectable panel in a human machine interface (HMI) associated with an operator computing system for an operator that is coupled to the process controller. Responsive to the displaying, the operator selects in the selectable panel at least one of the plurality of suggested actions (selected action). The selecting of the selected action results in the IPCS automatically implementing at least in part the step(s) associated with the selected action.

14 Claims, 5 Drawing Sheets

(52) U.S. Cl.
CPC ............... *G05B 2219/23174* (2013.01); *G05B 2219/23335* (2013.01); *G05B 2219/24001* (2013.01); *G05B 2219/24215* (2013.01)

(58) Field of Classification Search
CPC ........... G05B 2219/23335; G05B 2219/24001; G05B 2219/24215; G05B 2219/35494; G05B 19/058; G05B 23/0216; G05B 19/0428; G05B 23/0272; G05B 23/0267; G05B 2219/24103; G06Q 10/06; G06Q 10/20
See application file for complete search history.

(56) References Cited

U.S. PATENT DOCUMENTS

| | | |
|---|---|---|
| 8,781,987 B1 | 7/2014 | Shuster et al. |
| 9,733,626 B2 | 8/2017 | Friman et al. |
| 11,199,837 B2 | 12/2021 | Cella et al. |
| 2006/0092033 A1* | 5/2006 | Hoff .................... G06F 11/0739 700/83 |
| 2007/0208549 A1 | 9/2007 | Blevins |
| 2007/0232374 A1 | 10/2007 | Lopiccolo et al. |
| 2010/0082125 A1* | 4/2010 | Pingel ................. G05B 23/0272 700/47 |
| 2012/0042003 A1 | 2/2012 | Goetz et al. |
| 2012/0165087 A1 | 6/2012 | Epstein |
| 2014/0004487 A1 | 1/2014 | Cheben |
| 2014/0135947 A1 | 5/2014 | Friman |
| 2014/0282015 A1* | 9/2014 | Nixon .................... G05B 13/02 715/733 |
| 2017/0255192 A1 | 9/2017 | Thwaites et al. |
| 2018/0104589 A1 | 4/2018 | Kiyomoto et al. |
| 2019/0384267 A1 | 12/2019 | Krishnamurthy et al. |
| 2020/0081736 A1 | 3/2020 | Gopalan et al. |
| 2020/0103885 A1* | 4/2020 | Pani .................... G01R 31/343 |
| 2021/0096542 A1* | 4/2021 | Stump .................. G06F 11/079 |
| 2022/0044178 A1* | 2/2022 | Hollender ........ G06Q 10/06316 |
| 2022/0066425 A1* | 3/2022 | Bhat .................. G05B 19/4188 |

FOREIGN PATENT DOCUMENTS

| | | |
|---|---|---|
| EP | 3599527 A1 | 1/2020 |
| WO | 2006/102104 A1 | 9/2006 |
| WO | 2018/102228 A1 | 6/2018 |

OTHER PUBLICATIONS

Australian Examination Report dated Mar. 29, 2022, issued in connection with corresponding Australian Patent Application No. 2021203277 (3 pages total).

Australian Examination Report dated Nov. 23, 2022, issued in connection with corresponding Australian Patent Application No. 2021203277 (3 pages total).

First Examination Report in India dated Mar. 9, 2022, issued in connection with corresponding Indian Patent Application No. 202114022865 (6 pages total).

Extended European Search Report dated Oct. 8, 2021, issued in connection with corresponding European Patent Application No. 21175465.0 (10 pages total).

Extended European Search Report dated Nov. 30, 2021, issued in connection with corresponding European Patent Application No. 21178893.0 (8 pages total).

Indian Examination Report dated Feb. 24, 2022 issued in connection with corresponding Indian Application No. 202114025541 (7 pages total).

Australian Examination Report dated Mar. 9, 2022, issued in connection with corresponding Australian Patent Application No. 2021203799 (3 pages total).

Australian Examination Report dated Feb. 10, 2023, issued in connection with corresponding Australian Patent Application No. 2021203277 (3 pages total).

European Examination Report dated Mar. 17, 2023, issued in connection with corresponding European Patent Application No. 21178893.0 (7 pages total).

Extended European Search Report dated Oct. 13, 2023, issued in connection with corresponding European Patent Application No. 23171000.5 (11 pages total).

* cited by examiner

OPERATOR CONSOLE PROVIDING GUIDANCE FOR OPERATOR DECISIONS

CROSS REFERENCE TO RELATED APPLICATIONS

This application claims the benefit of Provisional Application Ser. No. 63/031,903, entitled "OPERATOR CONSOLE PROVIDING GUIDANCE FOR OPERATOR DECISIONS", filed May 29, 2020, which is herein incorporated by reference in its entirety.

FIELD

This Disclosure relates to industrial process control and automation system (IPCS's), more particularly to automated assistance for an operator of the IPCS.

BACKGROUND

IPCS are commonly used to automate large and complex industrial processes. These systems routinely include process controllers and field devices including sensors and actuators. The process controllers typically receive measurements from the sensors and generate control signals that are sent to the actuators.

IPCS are commonly used in various industries to run production processes, and can for example be configured with control schemes using programmable logic controllers (PLC(s)), or in the case of more complex systems using distributed control systems (DCS) or supervisory control and data acquisition systems (SCADA). Automated process control relies on one or more process controllers that are communicatively coupled by input/output (I/O) modules coupled to one or more field devices that are coupled to processing equipment, where the field devices comprise sensors for sensing parameters such as temperature and pressure, and actuators configured for receiving control signals generated by the process controllers and adjusting settings of the processing equipment.

The operator's activity in an IPCS generally involves utilizing a set of standard operating procedure(s) (SOP(s)) which describe methods for an operator' actions for operating the IPCS including responding to current situations such as alarms, where the operators referred to herein as industrial console operators have an operator console including an operator computer system including a human machine interface (HMI). The operator computer system is configured to monitor the process and to implement various actions to achieve a desired process state or process outcome. Industrial console operators are generally trained to implement the SOPs corresponding to the respective process run by the IPCS that they are responsible to operate.

The job of an industrial console operator is made difficult due to several major factors that can limit their effectiveness. Two such factors are the knowledge an industrial console operator has of what corrective actions to take in any given operating situation, such as in the case of alarms, failures, or other abnormal situations, and the efficiency of the industrial console operator's operator console in allowing them to perform those corrective actions. An experienced operator may know what to do, but the mechanics of taking the required corrective actions may limit the effectiveness of their response by requiring too many interactions with the HMI to implement the various sequential steps of the corrective action. For example, responding to an alarm may require an industrial console operator to navigate to the relevant HMI, select the relevant control loop, change the mode of the control loop to manual, and then make one or more manual changes to the output (setpoint) of the control loop. Only the last of these operator' actions have a direct effect on the industrial process.

SUMMARY

This Summary is provided to introduce a brief selection of disclosed concepts in a simplified form that are further described below in the Detailed Description including the drawings provided. This Summary is not intended to limit the claimed subject matter's scope.

Disclosed aspects recognize the problem of less experienced industrial console operators associated with industrial process control in an IPCS facing an added difficulty of not being sure of what corrective action to take responsive to a current situation, responsive to a current abnormal situation occurring in the industrial process in the first place. The corrective action is a remedial action in the case the current situation is an alarm or a maintenance action in the case the current situation is routine maintenance generally meaning a regularly scheduled maintenance event. Alternatively, the industrial console operator may know what to do in general responsive to a current situation, but are unfamiliar with the specific names of entities displayed in the HMI they need to interact with to take the actions in the industrial process. Disclosed aspects solve this problem by making the HMI responsive to the current situation so that the industrial console operators are presented with a selection of suggested actions each including a plurality of steps in a selectable panel of an HMI that are determined to likely be needed, and also a more direct mechanism for implementing at least one of the suggested actions, where the IPCS automatically implements at least in part the at least one step associated with the selected action.

It is recognized that although basic context-based guidance for operators may be known, disclosed aspects go further by making the HMI of the operator computer system responsive to the context-based guidance, including responsive to the operator selecting in the selectable panel of the HMI at least one of a plurality of suggested actions (selected action) that are displayed, automating of the steps for the selected action that each previously required operator interaction with the HMI to implement. This disclosed aspect makes the HMI of the operator computer system more efficient and also allows the operator to better concentrate on those actions that have a direct impact on the industrial process.

Less experienced operators benefit from a level of guidance provided as to what the suggested actions are. Both less experienced and more experienced industrial console operators benefit from being able to perform the necessary actions more efficiently, such as when the least one step comprises a plurality of steps, wherein the IPC automatically implementing includes implementing at least one of the plurality of steps exclusively automatically, and wherein an only action by the operator to implement the method can consist of a single click of a mouse associated with the operator computing system.

DETAILED DESCRIPTION

Disclosed aspects are described with reference to the attached figures, wherein like reference numerals, are used throughout the figures to designate similar or equivalent elements. The figures are not drawn to scale and they are provided merely to illustrate aspects disclosed herein. Several disclosed aspects are described below with reference to example applications for illustration. It should be understood that numerous specific details, relationships, and methods are set forth to provide a full understanding of the aspects disclosed herein.

Also, the terms "coupled to" or "couples with" (and the like) as used herein without further qualification are intended to describe either an indirect or direct electrical connection. Thus, if a first device "couples" to a second device, that connection can be through a direct electrical connection where there are only parasitics in the pathway, or through an indirect electrical connection via intervening items including other devices and connections. For indirect coupling, the intervening item generally does not modify the information of a signal but may adjust its current level, voltage level, and/or power level.

As used herein an IPCS runs an industrial process involving a tangible material that disclosed aspects apply. For example, oil and gas, chemical, beverage, pharmaceutical, pulp and paper manufacturing, petroleum processes, electrical power including renewable energy, and water. An IPCS is distinct from a data processing system that only performs data manipulations.

Figure 1:
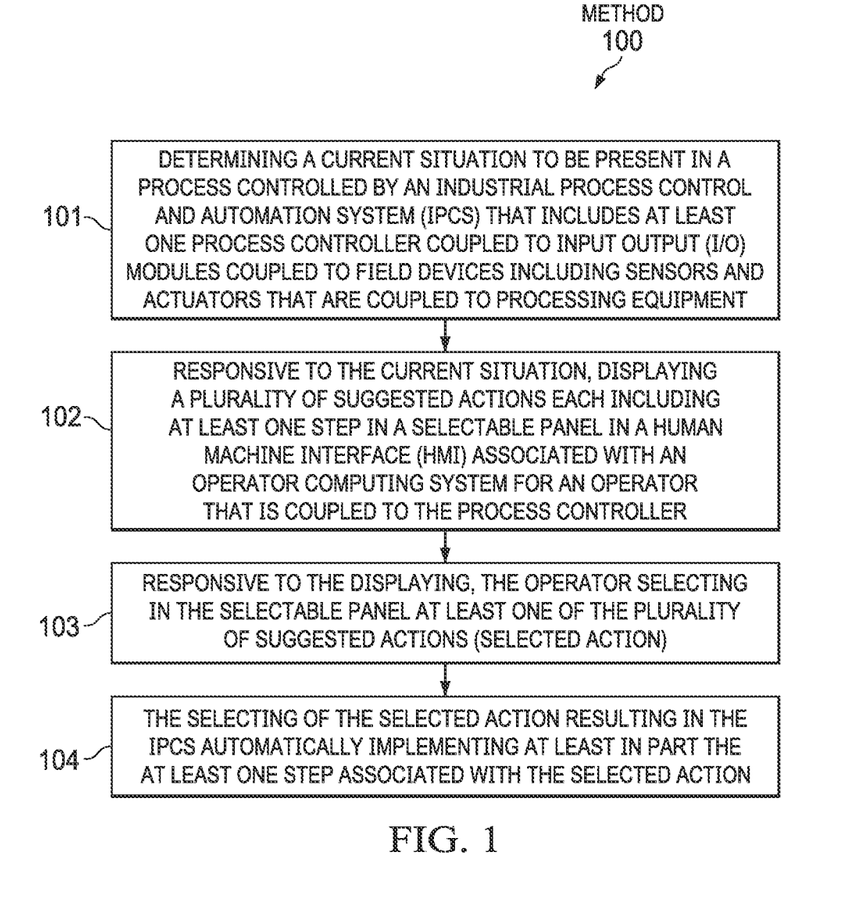
FIG. 1 is a flowchart that shows steps for an example method of operator assistance responsive to a current situation comprising providing guidance in the form of suggested actions for industrial console operator decisions responsive to the current situation, according to a disclosed aspect.

FIG. 1 is a flowchart that shows steps for an example method 100 of operator assistance responsive to a current situation, according to a disclosed aspect. Step 101 comprises determining a current situation to be present in a process controlled by an IPCS that includes at least one process controller coupled to I/O modules coupled to field devices including sensors and actuators that are coupled to processing equipment. The IPCS can be the IPCS 200 shown in FIG. 2. described below.

Step 102 comprises responsive to the current situation, displaying a plurality of suggested actions each including a plurality of steps in a selectable panel in an HMI associated with an operator computing system for an operator that is coupled to the process controller. The panel may be labeled for example as "Suggested Actions". Step 103 comprises responsive to the displaying the operator selecting in the selectable panel at least one of the plurality of suggested actions (selected action). Step 104 comprises responsive to the selecting of the selected action the IPCS automatically implementing at least in part the at least one step associated with the selected action.

In some cases, the suggested action may only consist of a single step. The step(s) can be fully or partially automated. For example, in the example in the example section described below, there are four steps, and all four steps besides the final step are fully automated. The final step comprising the entering of the setpoint, is partially automated in that the HMI prepares to accept the value for the new setpoint, without the operator having to do anything other than entering (typically typing in) the new value. Normally the operator will at least select the setpoint from among the available parameters for the control loop, but this part of the step is automated. There may also be cases where the suggested action includes the value the setpoint should be changed to, in which case the setpoint change can be fully automated.

The at least one step as described above can comprise a plurality of steps, the IPC automatically implementing can include implementing at least one of the plurality of steps exclusively automatically, and wherein an only action by the operator to implement the method can consist of a single click of a mouse associated with the operator computing system. Alternatively, if the operator computing system supports voice recognition, such as having installed DRAGON software, it may also be possible for the operator's only needed action to be a voice command.

The current situation can comprise an alarm event, and in that case the plurality of suggested actions comprises a plurality of suggested remedial actions. The current situation can also comprise a routine maintenance event, such as the routine maintenance being due based on a maintenance schedule.

The method can further comprise the operator computing system accessing a history of operations in the IPCS, typically from a data historian, including a plurality of previous situations, and the operator computing system using the history of operations regarding responses to the plurality of previous situations to provide the plurality of suggested actions for the current event. The history of operations in the IPCS including the plurality of the previous situations can comprise event logs, and the method can further comprise mining for prior examples of a related situation and an analysis of the actions previously taken to respond to the current situation, and then generating suggestions for the operator regarding what actions might be appropriate for the current situation.

The method can further comprise the operator computing system accessing SOPs including responses to a plurality of previous situations, and the operator computing system using the SOPs to provide the plurality of suggested actions for the current situation. The method can further comprise generating on the HMI a numerical indication of a level of confidence associated with the selected action, such as a particular setpoint was changed in 90% in a previous occurrence(s) of the current situation. The plurality of suggested actions can include a level of confidence regarding their relevance to the current situation.

Figure 2:
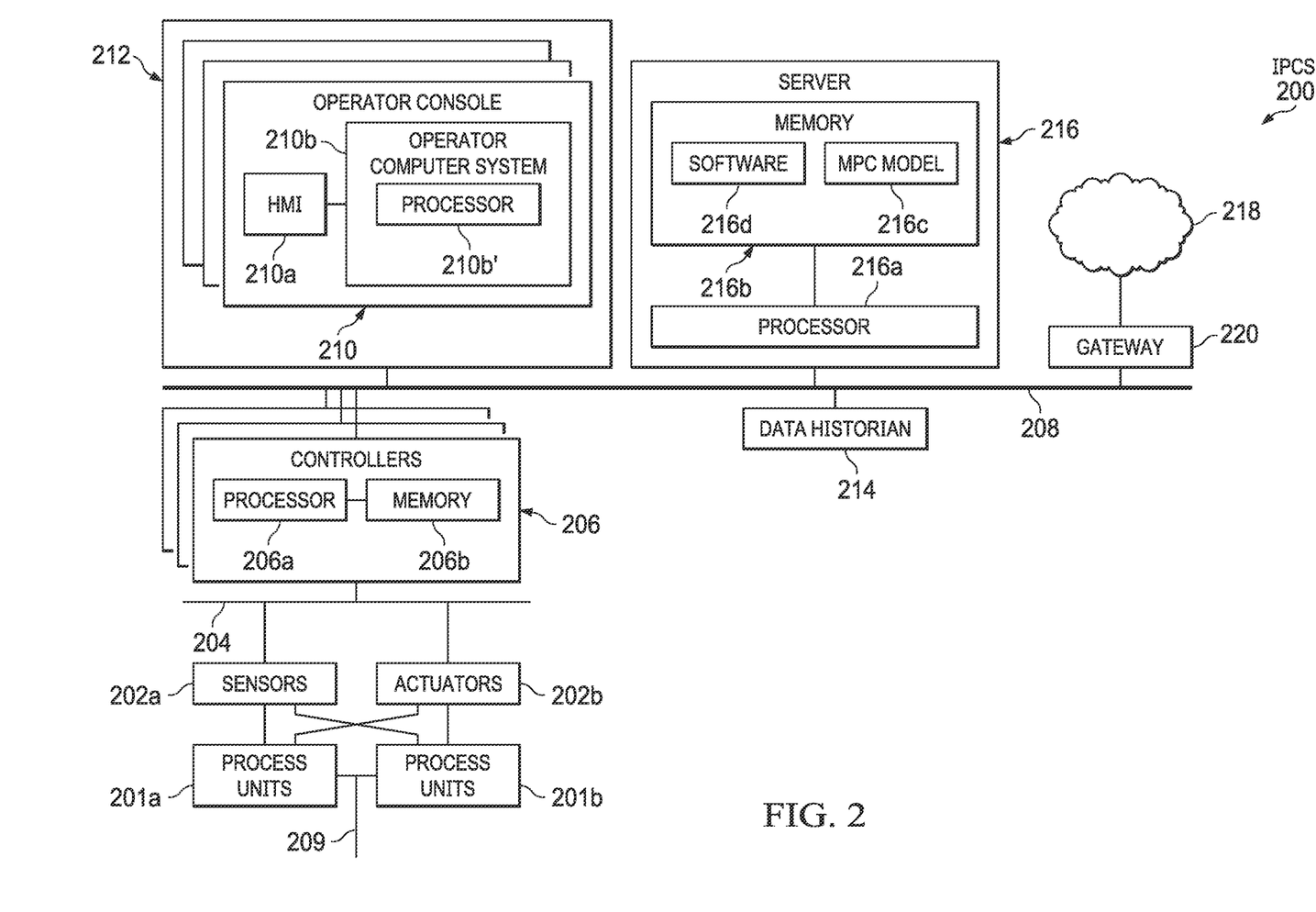
FIG. 2 illustrates an example IPCS that can benefit from disclosed aspects, according to a disclosed aspect.

FIG. 2 illustrates an IPCS 200 that can benefit from disclosed aspects. As shown in FIG. 2, the IPCS 200 includes various components that facilitate production or processing of at least one tangible product or other tangible material. For instance, the IPCS 200 can be used to facilitate control over components in one or multiple industrial plants. Each industrial plant represents one or more processing facilities (or one or more portions thereof), such as one or more manufacturing facilities for producing at least one tangible product or other tangible material. In general, each plant may implement one or more industrial processes, and can individually or collectively be referred to as being a processing system. A processing system generally represents any system or portion thereof configured to process one or more products or other tangible materials in some manner.

The IPCS 200 includes field devices comprising one or more sensors 202a and one or more actuators 202b that are coupled between the controllers 206 and the processing equipment, shown in simplified form as process unit 201a coupled by piping 209 to another process unit 201b. The sensors 202a and actuators 202b represent components in a process system that may perform any of a wide variety of functions. For example, the sensors 202a can measure a wide variety of characteristics in the processing system, such as flow, pressure, or temperature. Also, the actuators 202b can alter a wide variety of characteristics in the processing system, such as valve openings. Each of the sensors 202a includes any suitable structure for measuring one or more characteristics in a process system. Each of the actuators 202b includes any suitable structure for operating on or affecting one or more conditions in an IPCS.

At least one network 204 is shown providing a coupling between the controllers 206 and the sensors 202a and actuators 202b. The network 204 facilitates interaction with the sensors 202a and actuators 202b. For example, the network 204 can transport measurement data from the sensors 202a to the controllers 206 and provide control signals from the controllers 206 to the actuators 202b. The network 204 can represent any suitable network or combination of networks. As particular examples, the network 204 can represent at least one Ethernet network (such as one supporting a FOUNDATION FIELDBUS protocol), electrical signal network (e.g., a Highway Addressable Remote Transducer (HART protocol network)), pneumatic control signal network, or any other or additional type(s) of network(s).

The IPCS 200 also comprises various process controllers 206 generally configured in multiple Purdue model levels that may be present at all levels besides level 0, where level 0 generally only includes the field devices (sensors and actuators) and the process units. Each process controller comprises a processor 206a coupled to a memory 206b. The process controllers 206 can be used in the IPCS 200 to perform various functions in order to control one or more industrial processes.

For example, a first set of process controllers 206 corresponding to level 1 in the Purdue model may refer to smart transmitters or smart flow controllers, where the control logic is embedded in these controller devices. Level 2 generally refers to a distributed control system (DCS) controller, such as the C300 controller from Honeywell International. These level 2 controllers can also include more advanced strategies including machine level control built into the C300 controller, or another similar controller. Level 3 is generally reserved for controllers implemented by the server 216. These controllers interact with the other level (1, 2 and 4) controllers.

The level 1 controllers in the case of smart devices, or level 2 controllers such as the C300 controller, may use measurements from one or more sensors 202a to control the operation of one or more actuators 202b. The level 2 process controllers 206 can be used to optimize the control logic or other operations performed by the level 1 process controllers. For example, the machine-level controllers, such as DCS controllers, at Purdue level 2 can log information collected or generated by process controllers 206 that are on level 1, such as measurement data from the sensors 202a or control signals for the actuators 202b.

A third set of controllers implemented by the server 216 corresponding to level 3 in the Purdue model, known as unit-level controllers which generally perform model predictive control (MPC), can be used to perform additional functions. The process controllers 206 and controllers implemented by the server 216 can collectively therefore support a combination of approaches, such as regulatory control, advanced regulatory control, supervisory control, and advanced process control. In one arrangement, the third set of controllers implemented by the server 216 comprises an upper-tier controller corresponding to level 4 in the Purdue model, which generally also performs MPC control, also known as a plant-level controller, coupled to a lower-tier controller corresponding to level 3 in the Purdue model.

An MPC simulation model generally resides in a memory (shown as an MPC model 216c stored in memory 216b as shown in FIG. 2) associated with the upper-tier controller implemented by the server 216, wherein the upper-tier controller uses the MPC simulation model to predict movements in the process, participates in controlling the plant, and interacting with the MPC simulation model to optimize overall economics of the plant including sending an output from the MPC simulation model as setpoint targets to the lower-tier controller. The lower-tier controller uses the setpoint targets for diverting the raw material or the intermediate material in the piping network.

At least one of the process controllers 206 shown in FIG. 2 can denote a model-based process controller that operates using one or more process models. For example, each of these process controllers 206 can operate using one or more process models, including an MPC simulation model, to determine, based on measurements from one or more sensors 202a, how to adjust one or more actuators 202b. In some disclosed aspects, each model associates one or more manipulated variables (MVs) or disturbance variables (DVs) often referred to as independent variables, with one or more control variables (CVs) often referred to as dependent variables. Each of these process controllers 206 could use an objective function to identify how to adjust its manipulated variables in order to push its CVs to the most attractive set of constraints.

At least one network 208 couples the process controllers 206 and other devices in the IPCS 200. The network 208 facilitates the transport of information between to components. The network 208 can represent any suitable network or combination of networks. As particular examples, the network 208 can represent at least one Ethernet network.

Industrial console operator access to and interaction with the process controllers 206 and other components of the system 200 including the server 216 can occur via various disclosed operator consoles 210 which comprise an HMI 210a coupled to an operator computer system 210b that includes a processor 210b1. Each operator console 210 can be used to provide information to an industrial console operator and receive information from the operator. For example, each operator console 210 can provide information identifying a current state of an industrial process to the industrial console operator, such as values of various process variables and warnings, alarms, or other states associated with the industrial process.

Each operator console 210 can also receive information affecting how the industrial process is controlled, such as by receiving setpoints or control modes for process variables controlled by the process controllers 206 or process controller implemented by the server 216, or other information that alters or affects how the process controllers control the industrial process. Each operator console 210 includes any suitable structure for displaying information to and interacting with an operator. For example, the operator computing device can run a WINDOWS operating system or other operating system.

Multiple operator consoles 210 can be grouped together and used in one or more control rooms 212. Each control room 212 could include any number of operator consoles 210 in any suitable arrangement. In some disclosed aspects, multiple control rooms 212 can be used to control an industrial plant, such as when each control room 212 contains operator consoles 210 used to manage a discrete part of the industrial plant.

The IPCS 200 generally includes at least one data historian 214 that generally includes event logs that are entered by operators or technicians, and generally includes at least one server 216. The server 216 is generally in level 3 or 4 in the Purdue model. The processor 216a can comprise a digital signal processor (DSP), a microcontroller, an application specific integrated circuit (ASIC), a general processor, or any other combination of one or more integrated processing devices.

The data historian 214 represents a component that stores various information about the IPCS 200. The data historian 214 can, for instance, store information that is generated by the various process controllers 206 during the control of one or more industrial processes, as well as event logs. The data historian 214 includes any suitable structure for storing and facilitating retrieval of the information it stores. Although shown as a single component here, the data historian 214 can be located elsewhere in the IPCS 200, such as in the cloud, or multiple data historians can be distributed in different locations in the IPCS 200.

The server's 216 processor 216a executes applications for users of the operator consoles 210 or other applications. The applications can be used to support various functions for the operator consoles 210, the process controllers 206, or other components of the system 200. Each server 216 can represent a computing device running a WINDOWS operating system or other operating system. Note that while shown as being local within the IPCS 200, the functionality of the server 216 can be remote from the system 200. For instance, the functionality of the server 216 can be implemented in a computing cloud 218, or in a remote server communicatively coupled to the system 200 via a gateway 220.

Although FIG. 2 illustrates one example of an IPCS 200, various changes may be made to the IPCS 200. For example, the IPCSC 200 can include any number of sensors, actuators, controllers, networks, operator consoles, control rooms, data historians, servers, and other components.

A disclosed operator console including an HMI that displays suggested actions can be based on knowledge of what needs to be done responsive to a particular current situation in the industrial process controlled by the IPCS 200. For example, when an operator computing system 210b associated with the HMI 210a detects an alarm and has knowledge of how industrial console operators should respond to that particular alarm (e.g., what changes to make via the process control system), then the HMI 210a can present those as suggested actions to the operator with the short-cuts for the HMI interactions needed to implement those actions in the IPCS 200.

Knowledge of how to respond to a variety of particular current situations including abnormal situations such as alarms, or routine maintenance that is scheduled to be due, may be captured in SOPs or other procedural instructions. However, SOPs are typically expensive and difficult to establish and maintain over time. An alternative approach is to use the history of operations for the process control system, generally stored in a data historian as a source of knowledge of how to respond to a plurality of current situations. The operational history can be stored at the site of the IPCS, typically that the data historian, that has situation/event data, or can be stored at a plurality of different sites that generally all implement the same IPCS in the same industrial process. For example, operator generated event logs that are generally stored in a data historian can be 'mined' for prior examples of the same or a highly current situation and an analysis of the actions that were previously taken to respond to that current situation and the results of the action can be used to derive suggestions for an operator on what actions might be appropriate for action responsive to the current situation.

A generally important consideration is that industrial production processes (e.g., such as oil refining) can be very complex with many contingencies that might apply to the current situation and alter the required course of action. For this reason, it is recognized herein that industrial console operator suggested actions should take the form of suggestions (as opposed to automatic implementation) so that an operator may choose to act on if determined to be by the industrial console operator appropriate for the prevailing contingencies. To assist the operator with this, the suggested actions should generally take as much of the current operating context into account as possible to increase the relevance of the suggestions, use prior examples that are in some sense "good", and present some sort of indication of the level of confidence associated with the suggestion. For example, a particular setpoint was changed in 90% of the previous occurrences of this particular current situation.

Suggestion actions derived in this way can be presented in a "suggested action" panel in the HMI 210a. This panel alerts the operator to the corrective actions that are likely to be appropriate for the particular current situation. If the industrial console operator selects a suggestion in the panel the IPCS 200 can automatically perform actions such as navigating to the relevant display, selecting the relevant control loop, and changing the mode of the control loop so that all the industrial console operator needs to do is enter a new setpoint by a single click on a mouse associated their operator computer system. This aspect is illustrated in the scanned screenshot of an example HMI of an operator console shown as FIG. 3A together with FIG. 3B described below.

Deriving suggestions based on the history of operations of the IPCS stored in a data historian 214 including event logs can be accomplished by applying analytical techniques to the event logs produced by operators at operator consoles 210 over a sufficiently long period of time. For example, analytical techniques such as sequence mining and deep learning techniques (sequence-to-sequence networks, and convolutional networks), can be used to provide suggestions for upcoming (current) operator actions. These suggestions are based on the current state of the IPCS and the sequence of events leading up until the point in time that the current situation occurs.

EXAMPLES

Disclosed aspects are further illustrated by the following specific Examples, which should not be construed as limiting the scope or content of this Disclosure in any way.

As described above, although the basic provision of context-based guidance for operators may be known, disclosed aspects go further by making the HMI of the operator computer system responsive to that guidance, including responsive to the operator selecting in a selectable panel of the HMI at least one of the plurality of suggested actions (selected action) that are displayed, and providing automation of the steps for the selected action that each previously required operator interaction with the HMI. This disclosed aspect makes the HMI of the operator computer system more efficient and allows the operator to concentrate on those actions that have a direct impact on the industrial process.

Figure 3A:
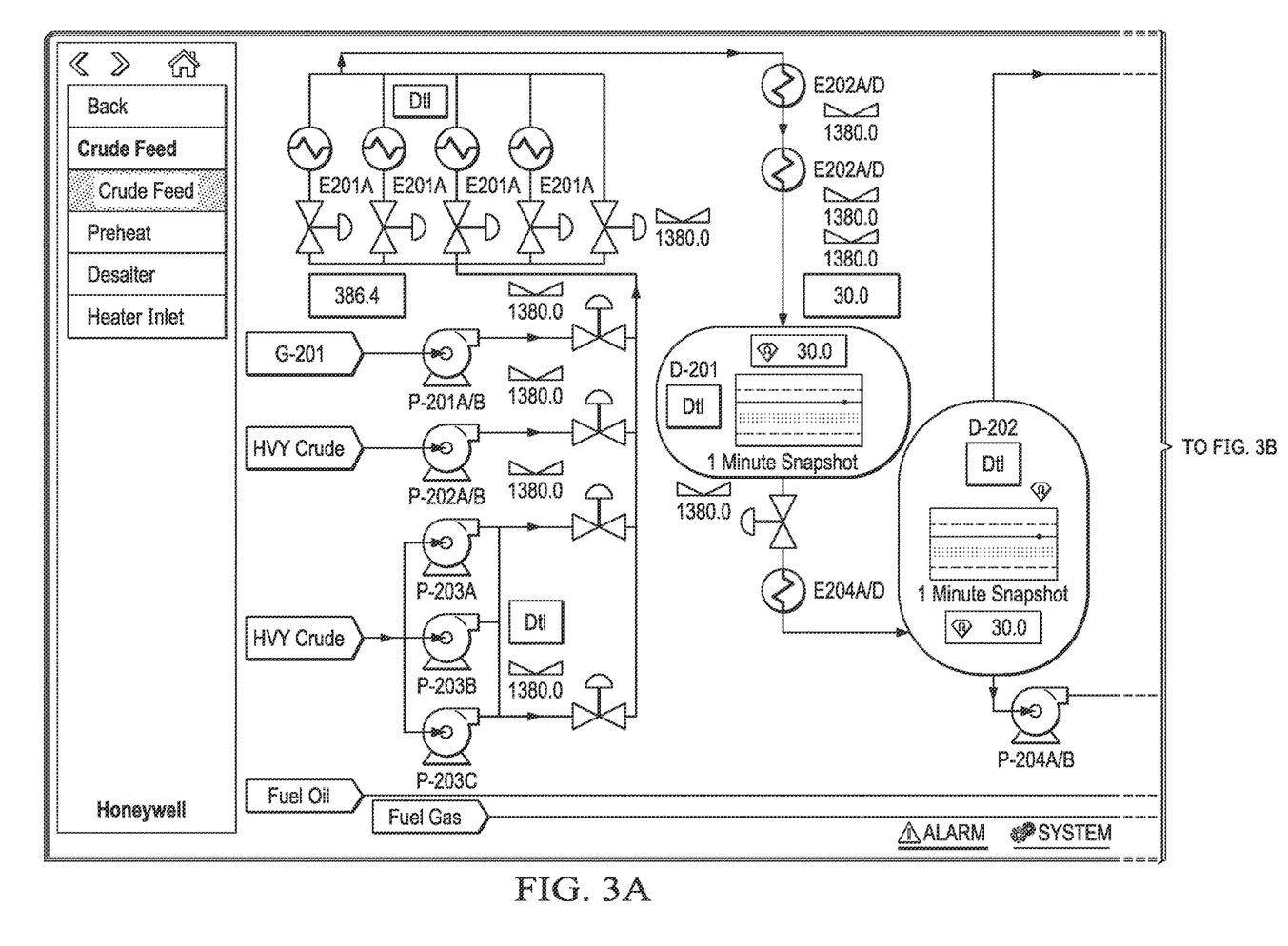
FIG. 3A together with FIG. 3B and FIG. 4 each show depictions of example screenshots for a disclosed HMI of an operator console that provides guidance in the form of a plurality of suggested remedial actions each including a plurality of steps for an industrial console operator's decisions responsive to a current situation.
Figure 3B:
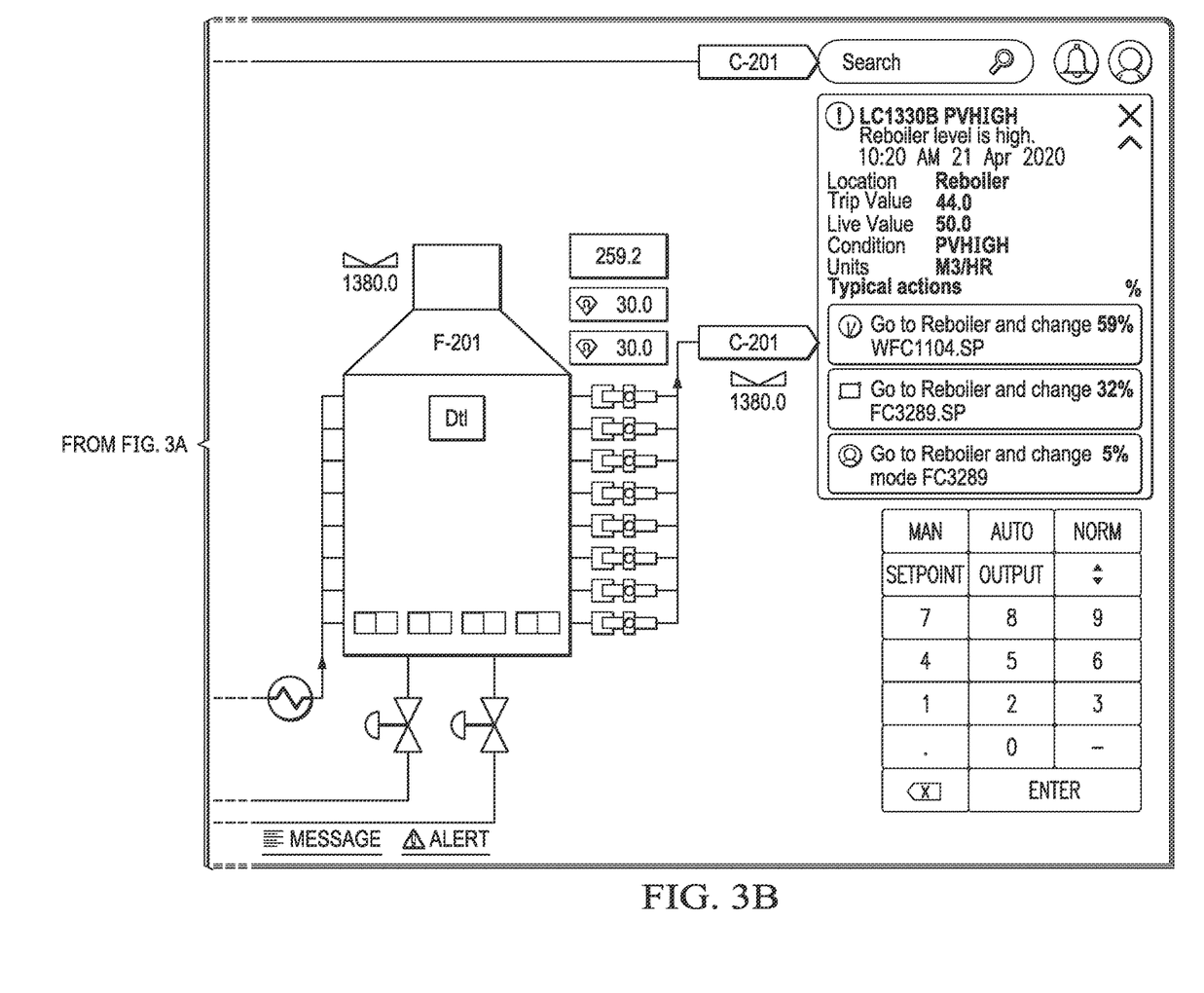
Figure 4:
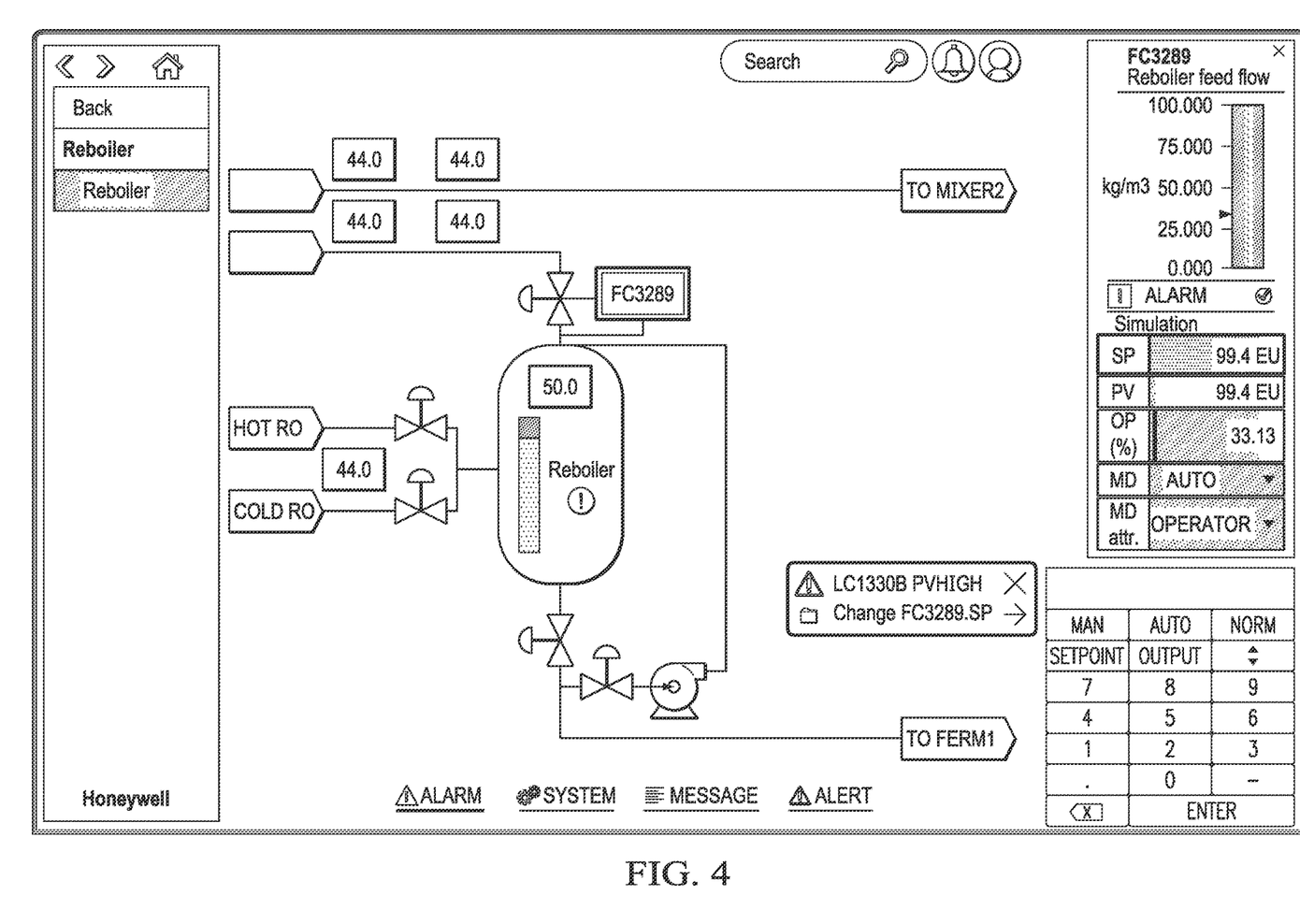

FIG. 3A together with FIG. 3B and FIG. 4 each show depictions of example screenshots for a disclosed HMI of an operator console that provides guidance for operator activity. A plurality of suggested actions is displayed in the panel of the HMI as part of the information display for a current situation, in this example being an alarm. As described above each suggested action includes a description of a sequence of a plurality of steps (sequence of individual actions) associated with the selected action. Each of the suggested actions can also optionally include a level of confidence (0 to 100%) regarding the relevance of each suggested action.

As described above, the operator selects at least one of suggested actions (selected action) displayed in the panel of the HMI, wherein the selecting of the selected action results in the IPCS automatically implementing at least one of the plurality of steps associated with the selected action. For example, in FIG. 3B there are three different suggested actions shown as being "typical actions" each configured to address the current situation of a reboiler level being high, where the "live" (current) value is shown as 50.0, and there is a high limit value for the reboiler level shown as a 'trip value' of 44.0. A portion of a flowsheet is also shown in FIG. 3A together with FIG. 3B as well that is unrelated to the reboiler having the high-level problem, which instead reflects the flowsheet the operator happened to be working from at the time that the alarm regarding the reboiler occurred.

This example assumes the selected action selected by the operator is shown as the phrase "Go to Reboiler and change FC3289.SP", shown in FIG. 3B having a confidence value of 32%, which refers to a sequence of four individual steps. FC refers to flow controller, where FC 3289 controls the reboiler head feed flow. These steps comprise first navigating to the reboiler display, selecting the FC3289 control loop on the display to invoke the faceplate for that control loop, changing the mode of the control loop to allow an operator setpoint change and, finally, entering a new value for the setpoint for the reboiler feed flow.

FIG. 4 depicts an example screenshot for a disclosed HMI showing the detail of the reboiler having the current situation (alarm for the reboiler). The control loop FC3289 is also shown as having been selected (shown in bold heavy outline on the schematic) and the information related to FC3289 is displayed in the faceplate to the right of the schematic. The mode of the FC3289 control loop is shown as having been changed to "AUTO" in the faceplate, indicating that it can now accept operator changes to the FC3289 control loop's setpoint. The setpoint parameter is shown as selected in the faceplate with an instructive callout indicating that the HMI is ready to accept a new setpoint, which the operator can enter using the keypad shown below the faceplate. All of the steps described above, from navigating to the reboiler detail display to the point where the operator is able to enter a new setpoint, constituted the automated response to selecting of the selected action in FIG. 3B.

The first three steps in this example reboiler level high correction sequence are generally implemented automatically by the IPCS, with only the operator entering a new value for the setpoint generally involving operator action. However, automatically entering the new value for the setpoint is also possible.

While various disclosed aspects have been described above, it should be understood that they have been by way of example only, and not as a limitation. Numerous changes to the disclosed aspects can be made in accordance with the Disclosure herein without departing from the spirit or scope of this Disclosure. Thus, the breadth and scope of this Disclosure should not be limited by any of the above-described aspects. Rather, the scope of this Disclosure should be defined in accordance with the following claims and their equivalents.

The invention claimed is:

1. A method to provide automated context-based guidance to an operator using an industrial process control and automation system (IPCS) including at least one processing device coupled to a memory device, the method comprising:
determining, by the at least one processing device, a current situation to be present in a process controlled by the IPCS that includes at least one process controller coupled to input output (I/O) modules coupled to field devices including sensors and actuators that are coupled to processing equipment;
accessing, by the at least one processing device, a history of operations stored in the memory device in the IPCS, the history of operations including a plurality of previous situations and responses to the plurality of previous situations to provide a plurality of suggested actions for the current situation;
responsive to the current situation, displaying the plurality of suggested actions each including at least one step in a selectable panel in a human machine interface (HMI) associated with an operator computing system that is coupled to the process controller of the IPCS, wherein each suggested action of the plurality of suggested actions includes a description of a sequence of individual actions includes a sequence of a plurality of steps associated with a respective suggested action, wherein each individual actions from the sequence of individual actions includes a level of confidence regarding their relevance of the respective suggested action, wherein the level of confidence includes a range of confidence regarding the relevance of each suggested action;
responsive to the displaying, the operator selecting in the selectable panel associated with the operator computing system at least one of the plurality of suggested actions (selected action); and
providing automation of steps associated with the selected action that results in the IPCS automatically implementing at least in part the steps associated with the selected action thereby providing automated context-based guidance to the operator, wherein automatically implementing comprises, responsive to the selecting by the operator, navigating the HMI to a display relevant to the selected action, selecting, by the processing device, a control loop relevant to the selected action, and changing, by the processing device, a mode of the control loop.

2. The method of claim 1, wherein the current situation comprises an alarm event, and wherein the plurality of suggested actions each comprise a plurality of suggested remedial actions.

3. The method of claim 1, wherein the current situation comprises a regularly scheduled maintenance event.

4. The method of claim 1, wherein the least one step comprises a plurality of steps, wherein the IPC automatically implementing includes implementing at least one of the plurality of steps exclusively automatically, and wherein an only action by the operator to implement the method consists of a single click of a mouse associated with the operator computing system.

5. The method of claim 1, wherein the history of operations in the IPCS including the plurality of the previous situations comprise event logs, further comprising mining for prior examples of the current situation and an analysis of the actions previously taken to respond to the current situation, and then generating the plurality of suggestion actions for the current situation.

6. The method of claim 1, further comprising the operator computing system accessing standard operating procedures (SOPs) including responses to a plurality of previous situations, and the operator computing system using the SOPs to provide the plurality of suggested actions for the current situation.

7. The method of claim 1, further comprising generating on the HMI a numerical indication of a level of confidence associated with the selected action.

8. A non-transitory computer readable medium containing instructions that when executed cause at least one operator console comprising an operator computer system including at least one processor device coupled to a human machine interface (HMI) causes the operator computer system to implement a method comprising:

determining, by the at least one processing device, a current situation to be present in a process controlled by an industrial process control and automation system (IPCS) that includes at least one process controller coupled to input output (I/O) modules coupled to field devices including sensors and actuators that are coupled to processing equipment;

accessing, by the at least one processing device, a history of operations stored in the memory device in the IPCS, the history of operations including a plurality of previous situations and responses to the plurality of previous situations to provide a plurality of suggested actions for the current situation;

responsive to the current situation, displaying the plurality of suggested actions each including at least one step in a selectable panel of the HMI, wherein the operator computing system is coupled to the process controller of the IPCS, wherein each suggested action of the plurality of suggested actions includes a description of a sequence of individual actions includes a sequence of a plurality of steps associated with a respective suggested action, wherein each individual actions from the sequence of individual actions includes a level of confidence regarding their relevance of the respective suggested action, wherein the level of confidence includes a range of confidence regarding the relevance of each suggested action;

responsive to the displaying, the operator selecting in the selectable panel associated with the operator computing system at least one of the plurality of suggested actions (selected action); and providing automation of steps associated with the selected action that results in the IPCS automatically implementing at least in part the steps associated with the selected action thereby providing automated context-based guidance to the operator, wherein automatically implementing comprises, responsive to the selecting by the operator, navigating the HMI to a display relevant to the selected action, selecting, by the processing device, a control loop relevant to the selected action, and changing, by the processing device, a mode of the control loop.

9. The computer readable medium of claim 8, wherein the current situation comprises an alarm event, and wherein the plurality of suggested actions comprises a plurality of suggested remedial actions.

10. The computer readable medium of claim 8, wherein the current situation comprises a routine maintenance event.

11. The computer readable medium of claim 8, wherein the least one step comprises a plurality of steps, wherein the IPC automatically implementing includes implementing at least one of the plurality of steps exclusively automatically, and wherein an only action by the operator to implement the method consists of a single click of a mouse associated with the operator computing system.

12. The computer readable medium of claim 8, wherein the history of operations in the IPCS including the plurality of previous situations comprise event logs, further comprising mining for prior examples of a situation and an analysis of the actions previously taken to respond to the current situation, and then generating the plurality of suggested actions.

13. The computer readable medium of claim 8, further comprising the operator computing system accessing standard operating procedures (SOPs) including responses to a plurality of previous situations, and the operator computing system using the SOPs to provide the plurality of suggested actions for the current situation.

14. The computer readable medium of claim 8, further comprising generating on the HMI a numerical indication of a level of confidence associated with the selected action.

* * * * *